No. 874,678. PATENTED DEC. 24, 1907.
W. W. HARRIS.
MACHINE FOR WEAVING TUBING.
APPLICATION FILED NOV. 18, 1904.

9 SHEETS—SHEET 1.

No. 874,678.
PATENTED DEC. 24, 1907.
W. W. HARRIS.
MACHINE FOR WEAVING TUBING.
APPLICATION FILED NOV. 18, 1904.
9 SHEETS—SHEET 5.
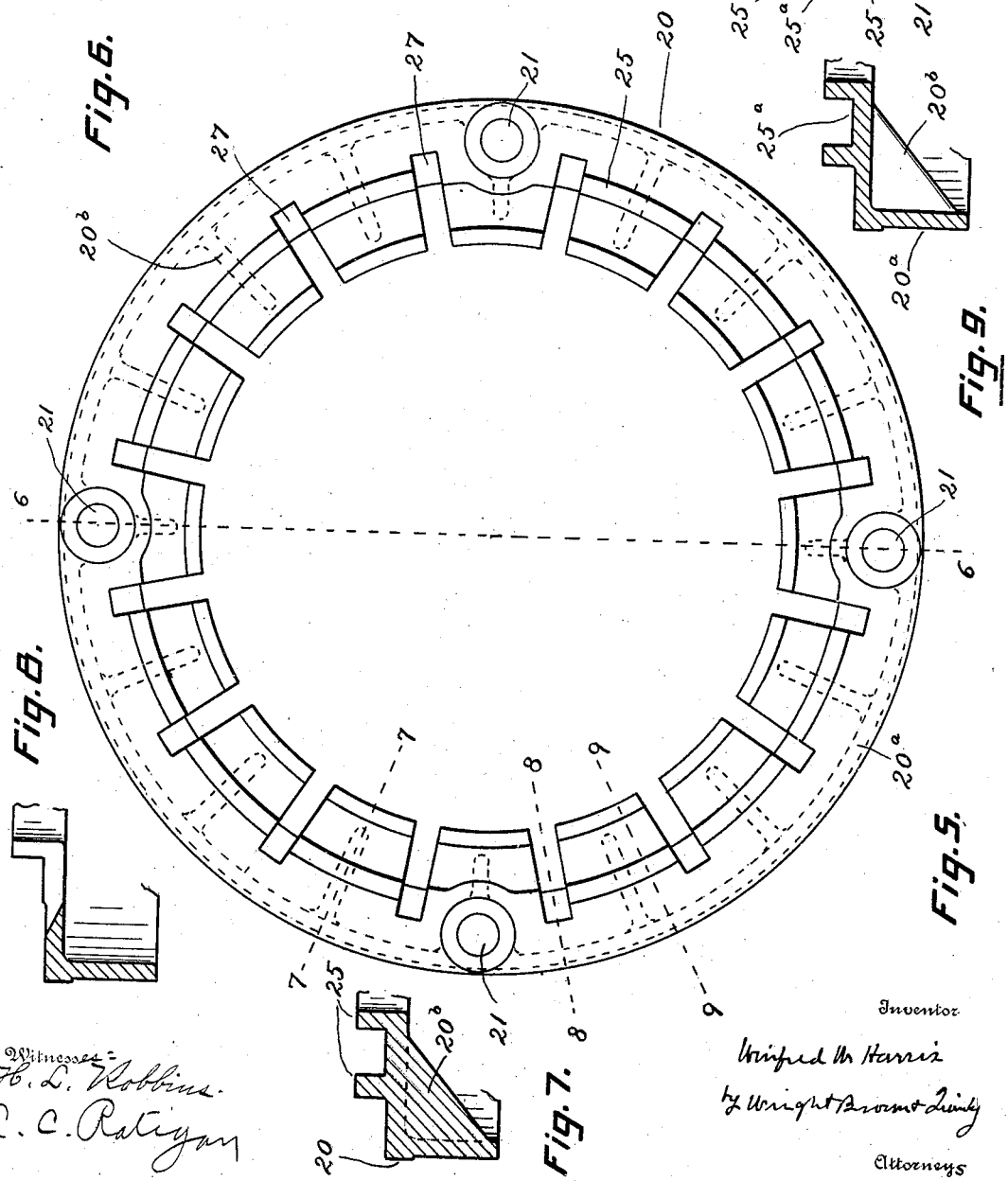

No. 874,678.  
PATENTED DEC. 24, 1907.  
W. W. HARRIS.  
MACHINE FOR WEAVING TUBING.  
APPLICATION FILED NOV. 18, 1904.  
9 SHEETS—SHEET 6.
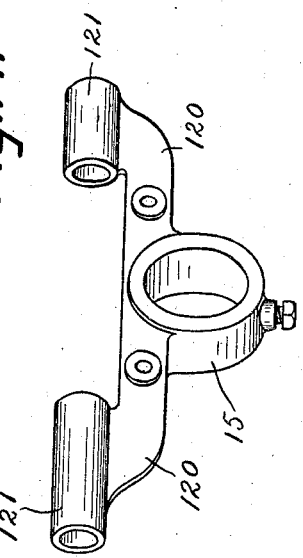
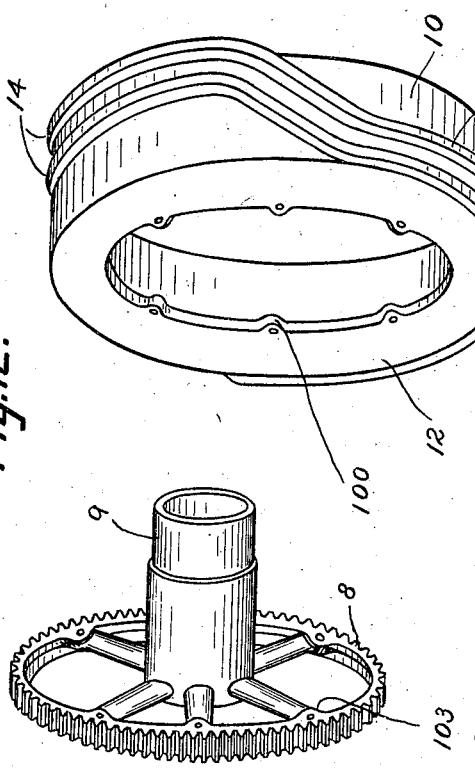
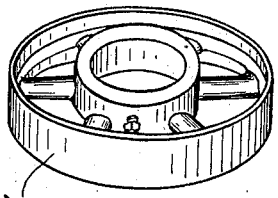
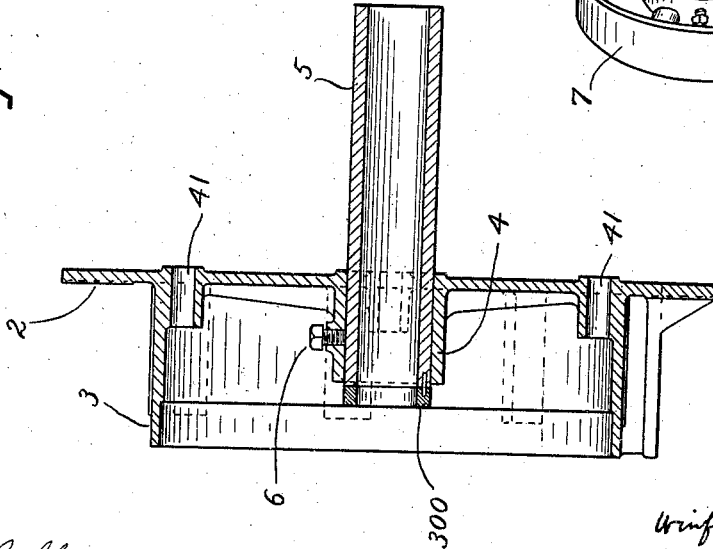

No. 874,678.  
PATENTED DEC. 24, 1907.  
W. W. HARRIS.  
MACHINE FOR WEAVING TUBING.  
APPLICATION FILED NOV. 18, 1904.

9 SHEETS—SHEET 7.

Witnesses  
H. L. Robbins  
A. C. Ratigan

Inventor  
Winfred W. Harris  
by Wright Brown + Quinby  
Attorneys

No. 874,678. PATENTED DEC. 24, 1907.
W. W. HARRIS.
MACHINE FOR WEAVING TUBING.
APPLICATION FILED NOV. 18, 1904.
9 SHEETS—SHEET 9.
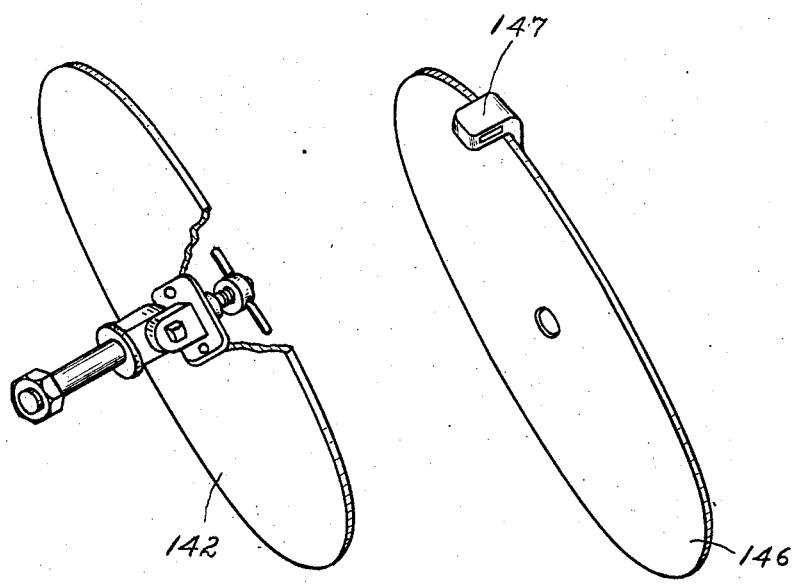
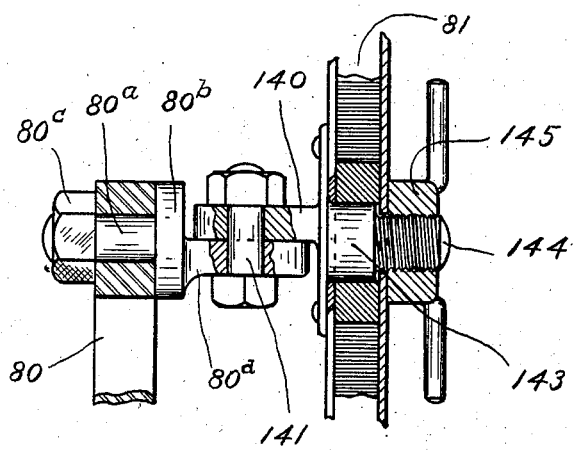

UNITED STATES PATENT OFFICE.

WINFRED W. HARRIS, OF WINTHROP, MASSACHUSETTS, ASSIGNOR TO EMMA M. WILSON, OF CHELSEA, MASSACHUSETTS.

MACHINE FOR WEAVING TUBING.

No. 874,678.      Specification of Letters Patent.      Patented Dec. 24, 1907.

Application filed November 18, 1904. Serial No. 233,327.

*To all whom it may concern:*

Be it known that I, WINFRED W. HARRIS, of Winthrop, in the county of Suffolk and State of Massachusetts, have invented certain new and useful Improvements in Machines for Weaving Tubing, of which the following is a specification.

This invention relates to improvement in circular looms.

The invention has for its object to so arrange to operate warp spools or members in a circular loom that in their movement to form the shed, the length of warp from the spools to the fabric will remain substantially constant, thus avoiding the use of takeups.

Figure 1:
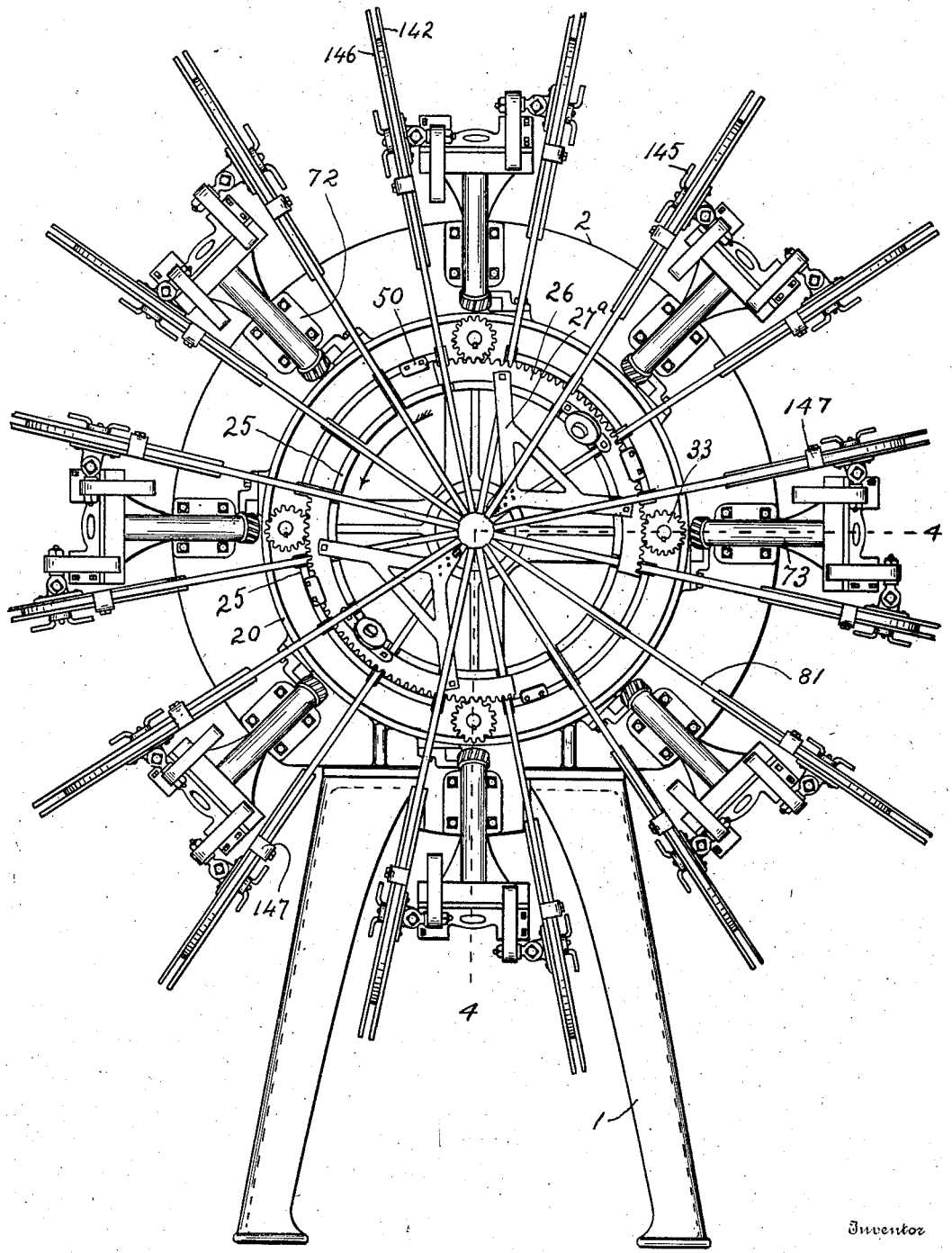
Figure 2:
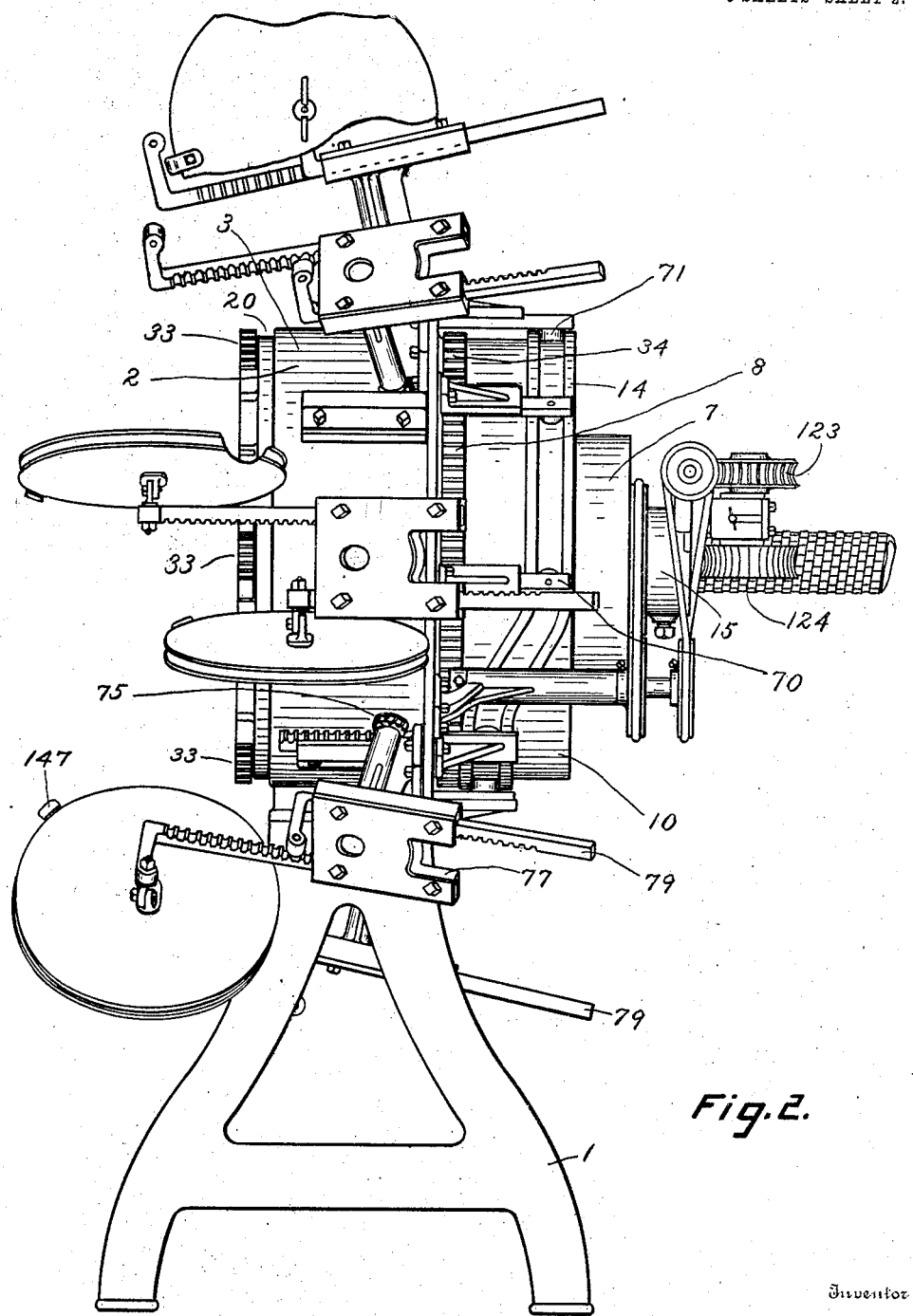
Figure 3:
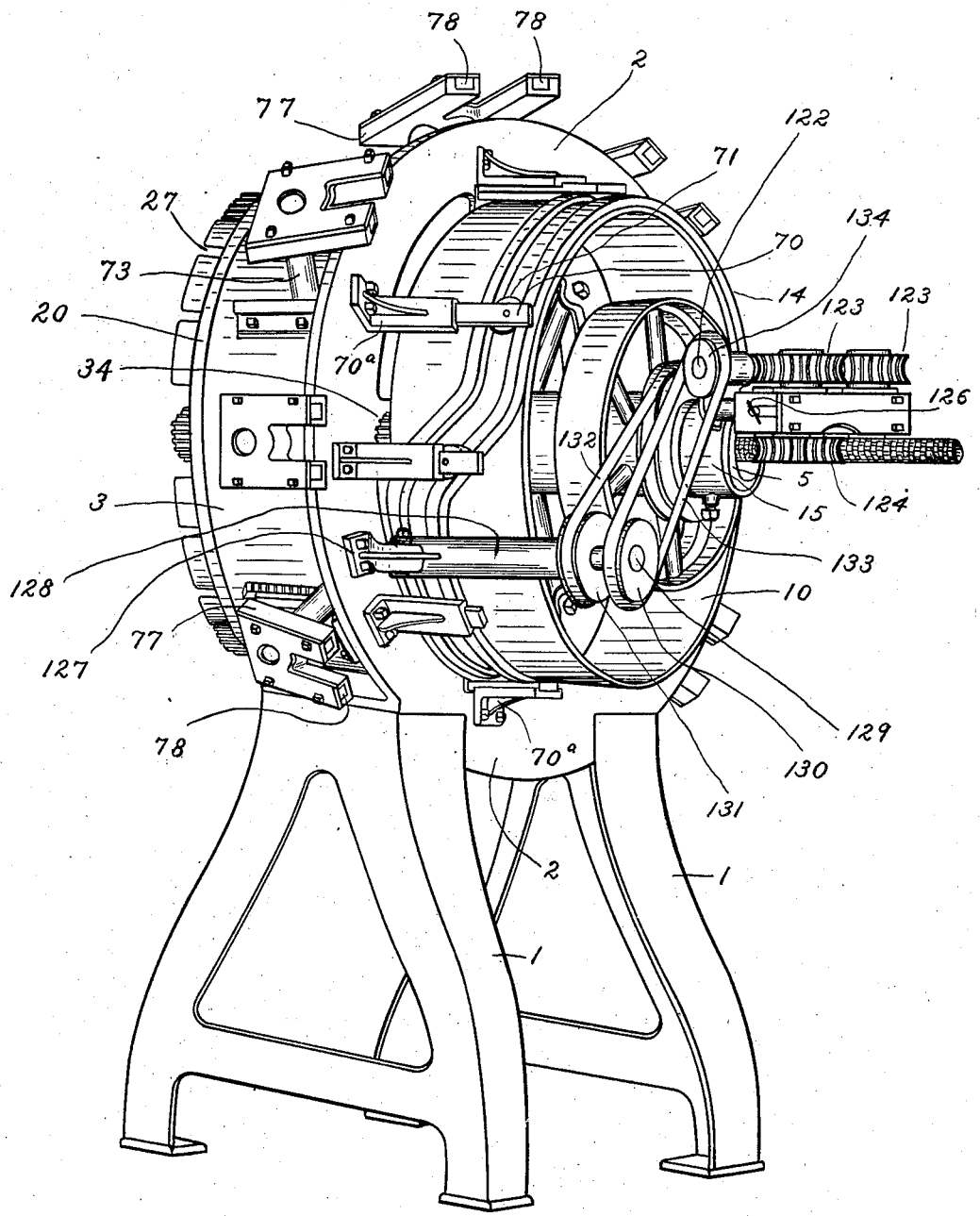
Figure 4:
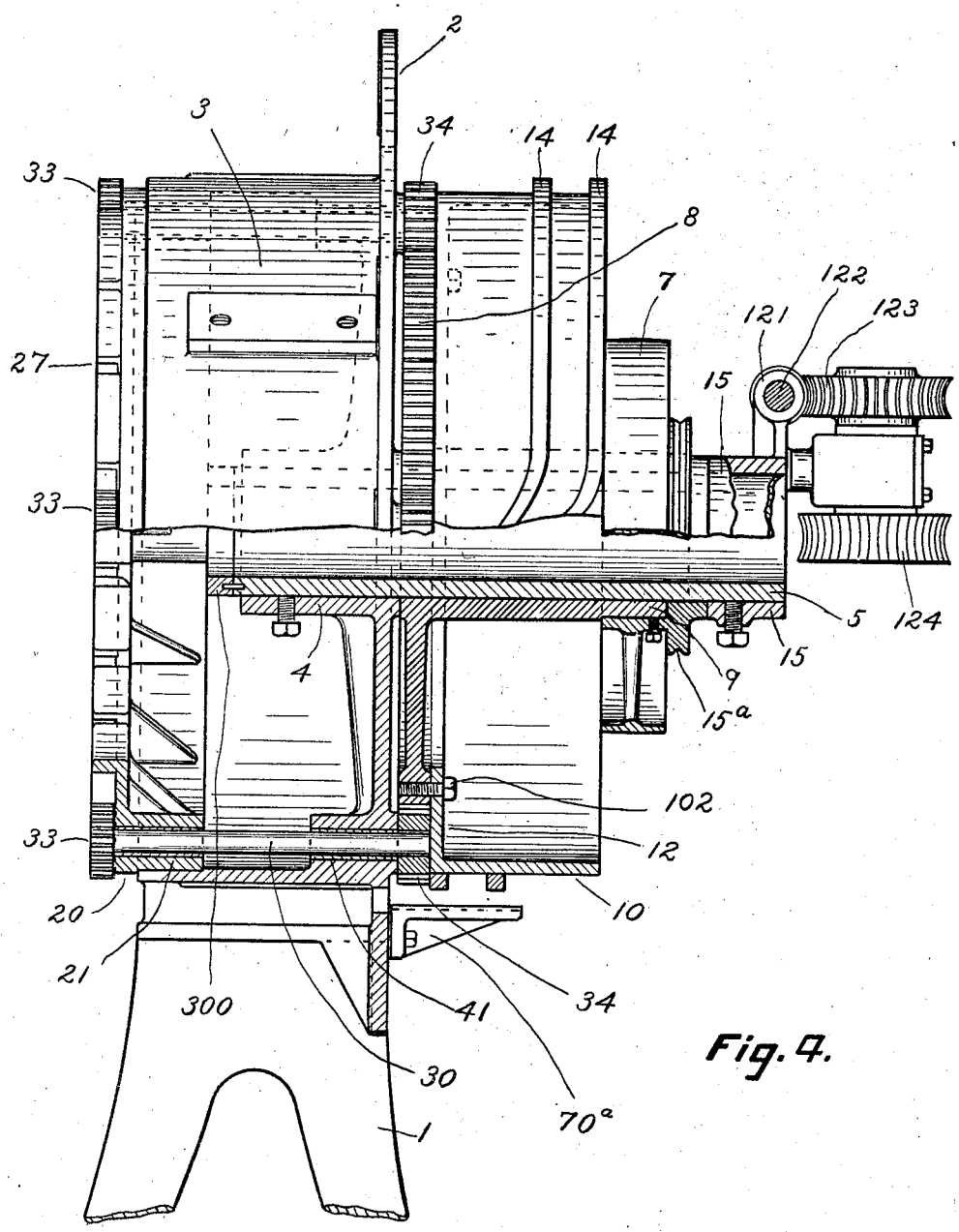
Figure 15:
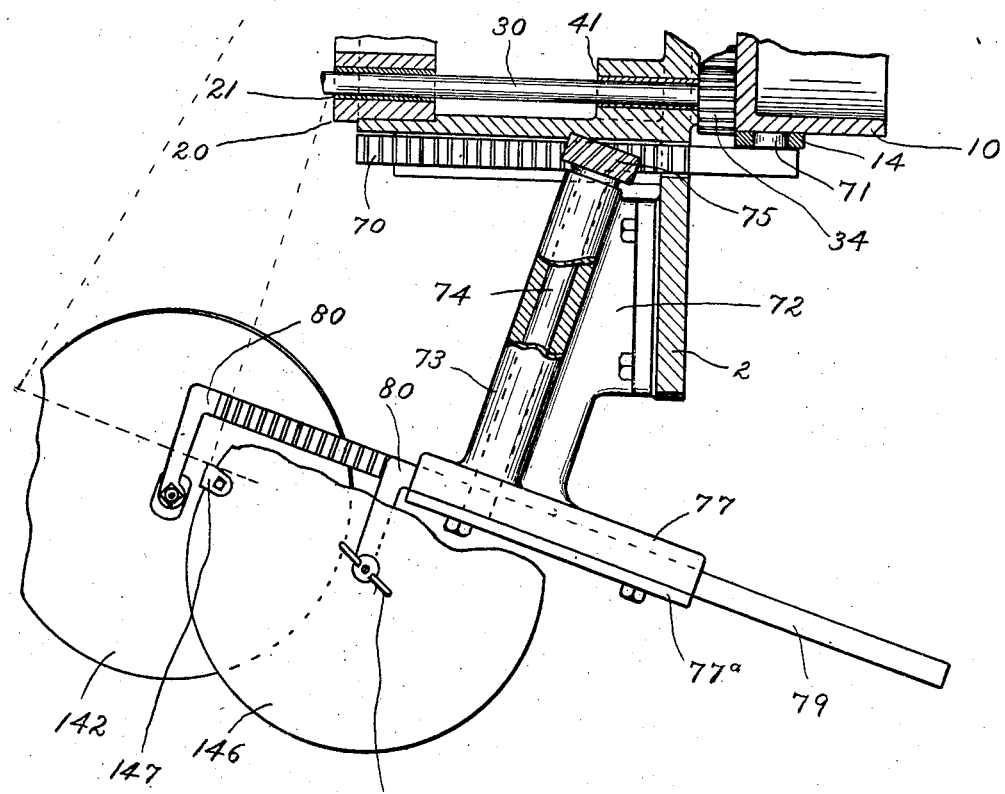
Figure 16:
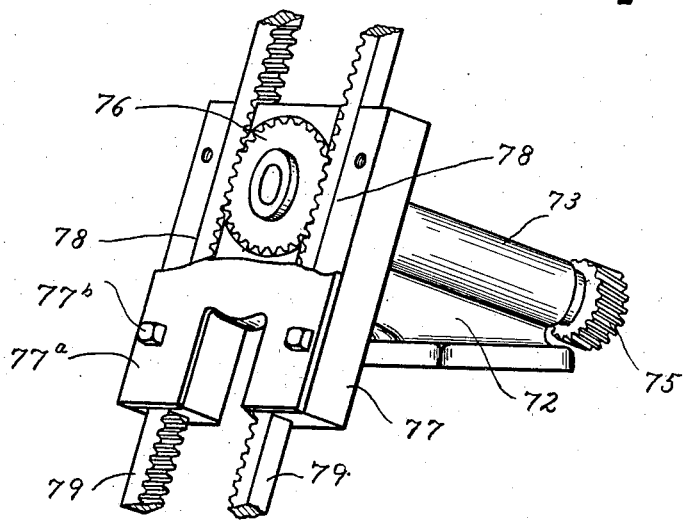
Figure 17:
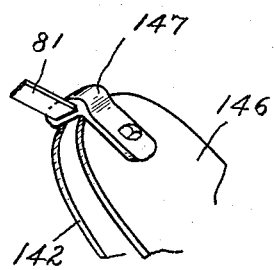
Figure 19:
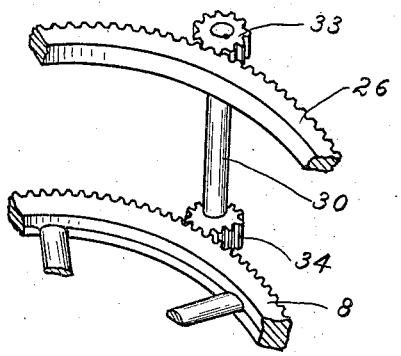
Figure 20:
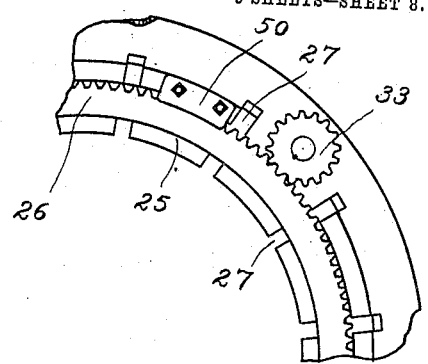
Figure 18:
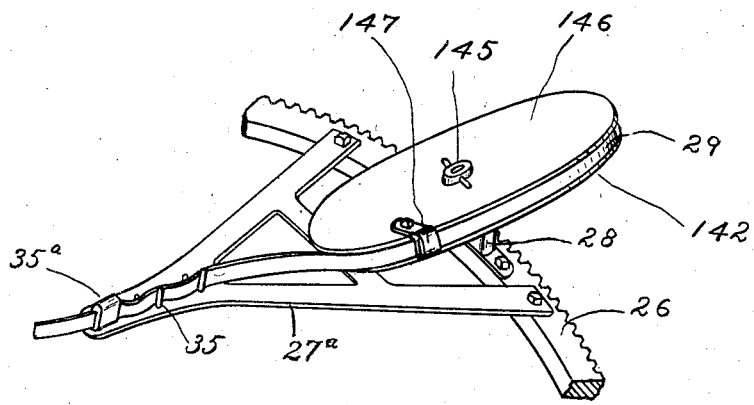
Figure 21:
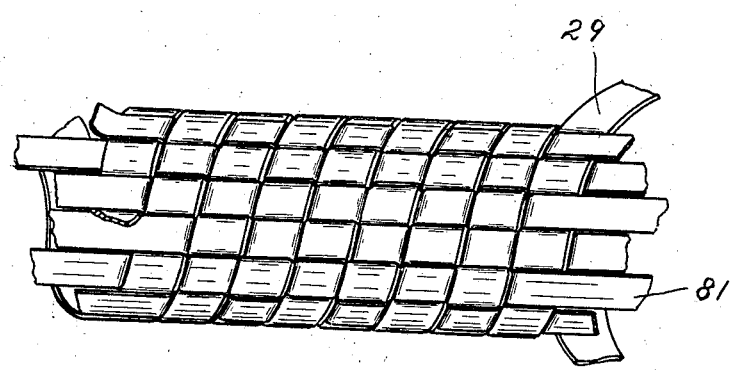

Figure 1 is a front elevation of a machine constructed in accordance with my invention. Fig. 2 is a side elevation of the machine, parts of the warp-wheels at the top of the machine being removed in order to show the arrangement of the warp-racks and the shuttle-gears. Fig. 3 is a perspective view of the machine taken at a point at the rear and one side, showing the arrangement of the mechanism at the rear of the machine, the cam-wheel for operating the warp-racks and the warp-rack guides, the warp-wheels and warp-racks being removed. Fig. 4 is a side elevation of the machine with the warp-wheels, their racks and guides removed, showing the central sleeve or throat of the machine and the parts carried thereon in their order and arragement, a part of the view appearing in section, on the line 4—4 of Fig. 1. Fig. 5 is a front elevation of the shuttle-ring. Fig. 6 is a cross sectional view thereof on line 6—6 of Fig. 5. Fig. 7 is a cross sectional view thereof on line 7—7 of Fig. 5. Fig. 8 is a cross sectional view thereof on line 8—8 of Fig. 5. Fig. 9 is a cross sectional view thereof on line 9—9 of Fig. 5. Fig. 10 is a longitudinal sectional view, showing the central sleeve or throat of the machine and the hub in which said sleeve is secured. Fig. 11 is a detail perspective view of a hub and its gear that in the assembled machine (see Fig. 4) is loosely arranged on the central sleeve. Fig. 12 is a detail perspective view of the cam-cylinder that in the assembled machine (see Fig. 4) is secured to the gear shown in Fig. 11. Fig. 13 is a detail perspective view of the driving pulley that in the assembled machine (see Fig. 4) is arranged upon the hub of the gear (Fig. 11), and in the rear of the cam-cylinder (Fig. 12). Fig. 14 is a detail perspective view of the feed-wheel collar that in the assembled machine is secured to the rear end of the central sleeve (Fig. 4). Fig. 15 is a detail view partly in section, showing one of the warp units. Fig. 16 is a detail view of two warp-racks and their common rack-gear or pinion, the latter not shown in Fig. 15. Fig. 17 is a detail view of a part of one of the warp-spools, showing the peripheral eye or guide for maintaining a constant point of feed. Fig. 18 is a detail perspective view of a shuttle unit. Fig. 19 is a detached view, showing in perspective a shuttle-rack and a pinion and gear—(Figs. 4 and 11)—for driving said rack. Fig. 20 is an end elevation or front view of a shuttle-rack, its pinion and a part of the shuttle-race or track, showing the clips for maintaining the rack in the shuttle-race. Fig. 21 is a detail perspective view of one form of the article made upon my improved loom. Fig. 22 is a detail perspective view of the rear member of the warp and the shuttle-spools. Fig. 23 is a like view of the front member. Fig. 24 is a detail view, partly in section, showing the manner of mounting the warp and the shuttle-spools.

Referring to Figs. 1, 2, 3 and 4, the framework of the machine comprises standards or legs 1 supporting a warp ring 2 arranged in a vertical plane as shown. The ring 2 supports and carries the various parts of the machine. The ring 2, as shown in Fig. 10, is formed with a horizontally arranged cylinder 3 and carries a central hub 4 inside said cylinder. In the hub 4 is secured a sleeve 5 by means of a set-screw 6. 8 represents a gear formed with an extended hub 9 loosely arranged upon the sleeve 5. 12 (Figs. 4 and 12) represents a ring formed on its inner periphery with perforated ears 100. Bolts 102 passing through said ears 100 and engaging complemental ears 103 (Figs. 4 and 11) on the gear 8 secure said ring 12 to the gear 8. The ring 12 on its rear side carries a horizontal cylinder 10 upon the periphery of which are formed two ribs 14 14 constituting a cam path said cylinder 10 with its ribs 14 constituting a cam-ring or cylinder. 7 represents a driving pulley rigidly secured on a reduced portion of the extended hub 9 of the gear 8 (see Figs. 4 and 11). 15ª represents a grooved pulley formed integral with and at the side of the pulley 7 (see Fig. 4). 15 represents a collar fast on the rear end of the sleeve 5, serving to maintain in place the hub 9, the gear 8, and the parts carried thereby. The collar 15 carries two arms 120 120, one on either side of said collar. The arms are arranged in horizontal position. Each arm 120 is formed with a hub 121 in which is arranged a worm-shaft 122 carrying worms meshing with two worm-gears 123 123. The two worm-gears 123, 123, mesh with the worm-shaft 122 arranged in the hubs 121 of the arm 120 above the throat 5, (see Figs. 3 and 4). To the lower end of the shaft of each gear 123 is secured a feed-wheel 124, there being one of these feed-wheels 124 on either side of sleeve or throat 5. The shaft carrying one gear 123 and feed-wheel 124 can be made to approach or recede from its complemental gear-wheel 123 and feed-wheel 124 on the opposite side of the throat of the cylinder 5 in order to accommodate the feed-wheels 124 to the size of the goods being made on the machine. This adjustment of the feed-wheels is effected by a screw-shaft 126 indicated in Fig. 3. 127 (see Fig. 3) represents a bracket secured to the rear face of the ring 2 and supporting a hub 128 in which is arranged a short shaft 129. Upon the rear end of this shaft are mounted two pulleys 130 131. A belt 132 connects the pulley 131 with the pulley 15$^a$. By this means rotation is imparted to the shaft 129. 133 represents a belt connecting the pulley 130 with a pulley 134 on the end of the shaft 122. The movement imparted to the shaft 122 is communicated to gears 123 and by them to the complemental feed-wheels 124 124. The feed mechanism above described takes its motion from the main driving pulley.

The warp mechanism of the machine is carried by the cylinder 3 and ring 2. In the form of the machine here shown eight warp units are illustrated, but as many may be employed as desired. These warp units are identical with one another and a description of one will suffice for all.

70 represents a rack arranged in suitable ways of a bracket 70$^a$ carried by the rear side of the ring 2. The rear end of this rack carries a roller 71 arranged between the ribs 14 of the cylinder 10, whereby a reciprocating or in-and-out motion is given to the rack 70, such reciprocation being in direct ratio to the rotation of the gear 8.

72 (Figs. 1, 3 and 15) represents a bracket carried by the front side of the ring 2. This bracket is formed with a head 73 which is arranged with a short shaft or pintle 74. On the rear end of this pintle is secured a gear 75 whose teeth are cut to mesh with those of the rack 70 (Fig. 15). Upon the front end of this pintle is secured the gear or pinion 76.

77 represents a plate carried on the front end of the bracket 72 and formed on its front side with two parallel grooves 78 78 in each of which is arranged a rack 79 with their teeth facing each other upon the opposite sides of and in mesh with the teeth of the pinion 76 (Fig. 16).

77$^a$ represents a plate secured to the top of the plate 77 by means of bolts 77$^b$ to maintain the racks 79 in their grooves. The arrangement is such that the reciprocation of the rack 70 due to the action of the cam on the cam-cylinder 10 gives a reciprocating motion to the gear 75 and its shaft and pinion 76, thereby giving a simultaneous reciprocating motion in opposite directions to the two racks 79. The upper end of each rack 79 is bent as at 80 and in the free end of said arm is arranged a bolt 80$^a$. The latter is formed with a head 80$^b$. A nut 80$^c$ upon the opposite end of said bolt serves to pinch the end of the arm 80 between the head and the nut and thus maintain the head 80$^b$ rigidly in position. The head 80$^b$ is formed with a perforated ear 80$^d$.

140 represents a complemental perforated ear pivotally secured to the ear 80$^d$ by means of a bolt 141. To the ear 140 is secured the rear member 142 of a warp-spool. The hub 143 of this spool is extended and has its free end screw-threaded at 144 to receive a thumb-nut 145.

146 represents the outer member of the spool adapted to be arranged upon the screw-threaded extension 144, the spool being held in position on the hub 143 by means of nut 145. To the periphery of the member 146 is secured an eye or guide 147 through which the warp 81 is fed, thus insuring a constant point of feed irrespective of the amount of the warp in the spool. A warp passes from the eye or guide 147 through suitable ways hereinafter described to the front end of the throat of the machine, where it is woven in with the weft.

The parts are so timed that the racks 79 reciprocate just in advance of the nose of the shuttle hereinafter described, thereby raising one warp 81 and lowering the other, forming the shed between the warps 81 through which the shuttle with its weft passes. This operation is repeated at each warp unit. In the form of the machine here shown, there being two shuttles, it will be understood that each is operated precisely as one shuttle, thus making the machine practically double, the timing of the warp units being controlled by the cam path 14 in the cylinder 10, this cam path in this form of machine being double, that is to say 360° of this cam path are divided into two units of 180°, each of said units being identical.

While in the form of machine here shown the shed is formed by the raising of one thread and the lowering of another, I do not wish to be understood as being limited to that form of shed, since the shed might be formed by the raising of two threads and the lowering of one, or vice versa, or according to any preferred plan.

20 (Figs. 1 to 9 inclusive) represents a ring formed with a flange 20ª adapted to be arranged in the front end of the cylinder 3 and secured in place by bolts or any preferred way.

20ᵇ represent brackets connecting the flange 20ª with the ring 20 acting as braces or supports to maintain two parts rigidly with respect to each other. The ring 20 near its periphery and inside the flange 20ª is formed with four bearings 21 arranged at an angle of 90° to each other, although the number and arrangement may be varied if desired. From the front side of the ring 20 project two concentric ribs 25, the inner rib being at the inner side of the ring 20 and the space between the two ribs constituting a groove or track 25ª. These ribs 25 as well as the inner part of the ring 20 are formed with radial cuts 27 which serve as passage-ways for the warp 81. In each bearing 21 is arranged one end of a short shaft 30, the other end of said shaft being arranged in a complemental bearing 41 formed in the ring 2. The rear end of each shaft 30 carries pinion 34 meshing with the gear 8. A pinion 33 is secured on the front end of each shaft 30. By this arrangement the pinions 30 are all given the same peripheral speed and together with the rest of the machine are timed up to the gear 8. In the circular race-track 25ª are arranged two racks 26 each slightly longer than 90° of the arc of the track in which they run. Inasmuch as the pinions 33 are arranged 90° apart it follows that one of these pinions will always be in engagement with the rack.

50 represent clips secured upon one of the ribs 25 and extending slightly over the space occupied by the racks 26 in order to keep the latter in the track 25ª. The arrangement is such that the racks here shown as two, (although the number may be varied) are driven around the track 25ª in the same direction. Each of the racks 26 carries a spider 27ª having a general A-shape, the legs of the spider being secured to the rack. To the apex of the spider is secured a guide-eye 35ª. A bracket 28 is secured to each rack 26 midway between the ends of the spider 27ª. To the top of bracket 28 is secured an ear substantially like the ear 80ᵈ (Fig. 24). The ear 80ᵈ has pivoted to it an ear 140 that supports a spool of weft 29. The warp spools and the shuttle-spools as well as their manner of mounting are the same so that the illustration of Fig. 24 of the warp spools will suffice, the purpose of the adjustment being to enable the spool to be tilted for applying cops or the like of warp or weft material. The weft 29 passes from the shuttle-spool through the eye 147, then through tension pins 35 and through the eye 35ª to the throat of the machine.

The operation of the machine is as follows: The warp and weft being brought to the center of the machine (see Fig. 1) engages the front edge of a forming ring 300 secured to the front end of the sleeve 5, the diameter of this ring being changed, depending upon the diameter of the goods to be made. The warp is then passed through the tube or cylinder 5 by hand and held if necessary until the machine has been operated long enough for the shuttles to lay sufficient weft in the warp so that the tube may be engaged by the feed wheels 124. As the machine continues to operate the shuttle-racks with the shuttles and spools of weft 29 pass around the machine, the warp-spools by means of their racks being alternately reciprocated to form a shed so that the forward end of each shuttle-rack passes over one warp and under the next, and so on, thereby weaving the weft alternately in and out about the warp. The tension may be adjusted as desired by means of the thumb-nuts 145, since by tightening or loosening said thumb-nuts, the friction of the members 142, 146 on the warp or the weft, as the case may be, may be varied. Owing to the position of the warp-spools and their path of movement with relation to the center of the ring 300, their thread-eye 147 is always at substantially the same distance from the center of the ring 300 and therefore no take-up is required.

The construction to effect the angular or peculiar movement of the warp-wheels so that no take-up is necessary is illustrated in Fig. 15, it being assumed that this particular warp unit is the one shown between the legs in Fig. 1 and covered by the section-line 4—4. In Fig. 15, the dotted lines show the direction taken by the warp from the guide-eye 147 to the ring 300, the arrangement of the parts being such that as the warp-wheel is reciprocated it is constrained to maintain a substantially uniform distance between the guide-eye 147 and the ring 300.

It is obvious upon an inspection of Fig. 1, that the shed may be formed by the alternate raising of each adjacent warp or by the raising of any predetermined number or arrangement of warps whether one or more than one, and the corresponding reverse motion of complemental warps. Each rack 26, spider 27 and spool of weft constitute in effect a shuttle. The machine is positive in its action and may be used with any desired shape or size of warp or weft.

While theoretically the warp racks should move in the arc of a circle, of which the ring 300 is the center, in order that the distance from the eye 147 to the ring 300 shall be the same at the points of movement of said rack, yet, as a practical matter I have found the inclination and arrangement of the racks as shown to meet the necessary requirements in this direction.

Having thus explained the nature of my invention and described a way of constructing and using the same, though without attempting to set forth all of the forms in which it may be made, or all the modes of its use, what I claim and desire to secure by Letters Patent is:—

1. In a machine for forming tubes, a cylinder or throat, a series of warp guiding members arranged about said throat, means connected to each member for reciprocating it to form a shed, arranged to maintain a substantially constant distance between said member and said throat, a shuttle device arranged to travel in the shed so formed, and means for operating said shuttle device.

2. In a machine for forming tubes, a cylinder or throat, a weft shuttle arranged to travel about said throat, a series of warp spools arranged about said throat, each formed with a thread-eye or warp-guide, an inwardly and forwardly inclined member connected with each spool, and means for reciprocating said members, whereby the movement of said spools to form a shed does not substantially vary the length of the warp from said eye to the work.

3. In a machine for forming tubes, a horizontal cylinder or throat, a warp ring arranged about said cylinder, a series of pairs of warp spools, a series of pairs of members supported by said ring, and each connected to one of said spools, a cam-ring supported by said cylinder, and connections between said cam-ring and said members.

In testimony whereof I have affixed my signature, in presence of two witnesses.

WINFRED W. HARRIS.

Witnesses:
WILLIAM QUINBY,
CHARLES THIBODEAU.